2,913,311
METHOD FOR PREPARING BORIC ACID

Oliver F. Senn, Los Altos, and Robert D. Englert, Menlo Park, Calif., assignors, by mesne assignments, to Olin Mathieson Chemical Corporation, a corporation of Virginia No Drawing. Application May 23, 1955
Serial No. 510,526
1 Claim. (Cl. 23—149)

This invention relates to a method for the manufacture of boric acid.

Methods for the manufacture of boric acid are available to the art. In one of those methods, a hot saturated solution of borax or finely granulated borax is charged into an acidifier. Sulfuric acid or hydrochloric acid is added until the solution is strongly acid. For example, three parts of borax in twelve parts of hot water can be used with one part of concentrated sulfuric acid. The hot solution is run from the acidifier into vacuum crystallizers where it is cooled to form crystalline boric acid. If desired, the boric acid thus produced can be refined by further crystallization from water.

The specific process just outlined is essentially based on sulfur and it would be desirable to have means for the production of boric acid from borax which are not dependent upon sulfur. Such means are provided in accordance with the process of the present invention in which boric acid is produced from borax using barium hydroxide and carbon dioxide.

Thus, in accordance with the process of the present invention barium hydroxide and borax are reacted in aqueous solution to produce barium metaborate as a precipitate. The solution contains initially from 1.5 to 2.5 moles of barium hydroxide per mole of borax and contains at least 0.2 gram moles of barium hydroxide per liter and at least 0.2 gram moles of borax per liter. The barium metaborate so produced is separated and is then reacted in aqueous admixture with carbon dioxide to produce a precipitate of barium carbonate and an aqueous solution of boric acid from which crystalline boric acid can be separated by evaporating and cooling in the known manner. The two reaction steps of the process just described can be represented by the following equations:

(1) $Na_2B_4O_7 \cdot 10H_2O + 2Ba(OH)_2 \rightleftharpoons 2Ba(BO_2)_2 + 2NaOH + 11H_2O$ (2) $Ba(BO_2)_2 + CO_2 + 3H_2O \rightarrow BaCO_3 + 2H_3BO_3$

EXAMPLE

In order to produce barium metaborate from barium hydroxide and borax, each reactant was dissolved in a separate portion of hot (80–100° C.) water and solutions were mixed. After from 2 to 5 minutes of stirring or intermittent shaking, the precipitate of barium metaborate produced was removed by filtration. Table I sets forth information concerning various experiments which were conducted in this manner, the water being the total water used.

Table I

| Experiment Numbers | Moles Barium Hydroxide per Mole Borax | Moles Barium Hydroxide per liter Water | Moles Borax per liter of Water | Conversion Percent |
|---|---|---|---|---|
| 1 | 0.9 | 0.26 | 0.28 | 50 |
| 2 | 1.4 | 0.35 | 0.26 | 71 |
| 3 | 1.3 | 1.90 | 1.47 | 69 |
| 4 | 1.9 | 0.43 | 0.23 | 84 |
| 5 | 2.3 | 0.50 | 0.22 | 85 |
| 6 | 2.5 | 1.28 | 0.51 | 86 |
| 7 | 10.0 | 0.27 | 0.03 | 6 |
| 8 | 10.0 | 1.08 | 0.11 | 15 |

In order to convert barium metaborate produced in experiment number 4 of Table I to boric acid, 21.4 grams of the barium metaborate precipitate was admixed with 300 ml. of water and the admixture thus produced was charged to an autoclave. The temperature of the admixture was raised to 110° C. and the autoclave was pressured with carbon dioxide to 250 p.s.i.g. The contents of the autoclave were then held at 110° C. for one hour, following which the contents were removed from the autoclave and filtered. By this means, 99 percent of the barium metaborate was converted to boric acid. One percent of the total barium metaborate taken was found in admixture with the barium carbonate formed and 5 percent of the barium present in the barium metaborate was present in the filtrate. Table II sets forth this information as well as information concerning other experiments which were run in a similar manner. In the table the numerical temperatures given are those of the barium metaborate-water slurry at the time the carbon dioxide was charged and during the reaction period of the specified number of minutes. The word "reflux" indicates that carbonation was effected at the reflux point of the barium metaborate-water admixture.

Table II

| Experiment Numbers | Barium Metaborate Used, grams | Volume of Water Used, ml. | Conditions of Carbonation | | Time, min. | Conversion of Barium Metaborate to Boric Acid, Percent | Percent of Total Barium Metaborate Found in Barium Carbonate | Percent of Barium Found in Filtrate | Boric Acid Produced, grams |
|---|---|---|---|---|---|---|---|---|---|
| | | | Temperature° C. | Initial Pressure of $CO_2$, p.s.i.g. | | | | | |
| (1) | 21.4 | 300 | 110 | 250 | 60 | 99 | 1 | 5 | |
| (2) | 16 | 318 | 80–100 | 0 | 30 | 81 | ND | ND | |
| (3) | 5 | 100 | 150 | 250 | 30 | ND | ND | ND | 2.74 |
| (4) | 5 | 100 | 25 | 250 | 30 | ND | ND | ND | 2.77 |
| (5) | 5 | 100 | 140–150 | 50 | 30 | ND | ND | ND | 2.45 |
| (6) | 5 | 100 | 100–110 | 50 | 30 | ND | ND | ND | 2.60 |
| (7) | 5 | 100 | 100 | 250 | 30 | ND | ND | ND | 2.62 |
| (8) | (**) | 500 | 110–120 | 250 | 30 | ND | ND | 6 | |
| Residue from above | | 300 | 110 | 250 | 30 | 99(est) | 1(est) | 2 | |
| (9) | (**) | 500 | Reflux | 0 | 60 | ND | ND | 5 | |
| Residue from above | | 300 | Reflux | 0 | 30 | 98(est) | 2(est) | 0.5 | |
| (10)* | 19.9 | 150 | 100–115 | 250 | 30 | 95 | 5 | 1 | |

ND—Not determined.
*The slurry was boiled five minutes at atmospheric pressure after the treatment with carbon dioxide.
**Total barium metaborate from 27.4 g. Ba(OH)$_2$, 45.2 g. borax, and 423 ml. water, was not weighed but was used directly in these experiments.

In the step wherein the barium metaborate is produced from the borax and barium hydroxide, a mother liquor or filtrate is obtained which is a solution of unreacted barium hydroxide, barium metaborate, sodium metaborate and sodium hydroxide. For the sake of economy, it is advisable to have available means whereby the values present in this liquor can be recovered for recycle. This can be done by evaporation and crystallization to separate the liquor into distinct fractions, each containing mainly barium metaborate, barium hydroxide, sodium metaborate or sodium hydroxide.

In this experiment, a mother liquor was prepared by admixing a solution of 0.2 gram moles of barium hydroxide in 250 ml. of water and a solution of 0.08 gram moles of borax in 120 ml. of water at a temperature of about 90° C. to form the precipitate of barium metaborate with a conversion of 69 percent. The reaction mixture was filtered hot to obtain fraction 1. Fraction 2 was obtained by filtering after cooling to room temperature. The total volume of the filtrate at this point was about 500 ml. This filtrate was evaporated, cooled to room temperature and filtered to give fraction 3. The filtrate after filtration amounted to 90 ml. The evaporation was then continued to dryness. Hot water (20 ml.) was then added and the mixture was shaken and allowed to cool and was filtered to give fraction 4. The residual liquor (fraction 5) amounted to 13.6 ml. All fractions were analyzed, and the amounts of various salts calculated. The results are set forth in Table III.

Table III

| Fraction | Amount Collected | Calculated Weight in Grams of— | | | | |
|---|---|---|---|---|---|---|
| | | Barium Metaborate | Sodium Metaborate | Barium Hydroxide | Sodium Hydroxide | Total |
| 1 | 29.3 g | 24.3 | 0.3 | 0.0 | 0.7 | 25.3 |
| 2 | 6.43 g | 4.6 | 0.2 | 0.0 | 0.0 | 4.8 |
| 3 | 8.45 g | 2.9 | 0.0 | 3.8 | 0.3 | 7.0 |
| 4 | 1.80 g | 0.3 | 0.0 | 0.8 | 0.5 | 1.6 |
| 5 | 13.6 ml | 0.3 | 0.7 | 0.0 | 3.5 | 4.5 |
| | | | | | | 43.2 |
| Percent in Each Fraction | | | | | | |
| 1 | | 96.0 | 1.2 | 0.0 | 2.8 | 100.0 |
| 2 | | 95.8 | 4.2 | 0.0 | 0.0 | 100.0 |
| 3 | | 41.4 | 0.0 | 54.3 | 4.3 | 100.0 |
| 4 | | 18.8 | 0.0 | 50.0 | 31.2 | 100.0 |
| 5 | | 6.7 | 15.5 | 0.0 | 77.8 | 100.0 |
| Percent of Total | | | | | | |
| 1 | | 56.3 | .7 | 0.0 | 1.6 | 58.6 |
| 2 | | 10.7 | .5 | 0.0 | 0.0 | 11.2 |
| 3 | | 6.7 | 0.0 | 8.8 | .7 | 16.2 |
| 4 | | .7 | 0.0 | 1.9 | 1.2 | 3.8 |
| 5 | | .7 | 1.6 | 0.0 | 8.1 | 10.4 |
| Total | | 75.1 | 2.8 | 10.7 | 11.6 | 100.2 |

As may be observed from Table III, the majority of the barium metaborate was concentrated in fractions 1 and 2. Residual barium hydroxide was concentrated in the next two fractions which can suitably be recycled to the step in which barium metaborate is prepared from barium hydroxide and borax. Sodium hydroxide was concentrated in the residual liquors. In the boric acid-producing step, barium carbonate is produced as a side product. If desired, it can be reacted in known manner with carbon to produce carbon monoxide and barium oxide, which in turn can be converted to barium hydroxide for recycle to the step in which barium hydroxide is reacted with borax.

Various modifications can be made in the procedures of the specific example to provide other embodiments which fall within the scope of this invention. In general, in the step wherein barium metaborate is produced, the reaction temperature will be within the range from about 50 to about 100° C., although somewhat lower and somewhat higher reaction temperatures can also be employed. The specific examples illustrate that in the carbonation of the barium metaborate the reaction temperatures can vary widely. Usually, however, the weight ratio of water to barium metaborate will be within the range from about 3:1 to 15:1. The molar proportions of carbon dioxide in solution to barium metaborate in the slurry can be varied from about 0.2:1 to 20:1, although it is obviously essential to supply stoichiometric amounts. The preferred range of partial pressures of carbon dioxide is 50–250 p.s.i. above the slurry at the temperature of reaction which may be, for example, 80–150° C. Such partial pressures and temperatures place the preferred range of molar proportions in the range of 0.5:1 to 5:1 moles of carbon dioxide in solution per mole of barium metaborate in the slurry.

It is claimed:

A method for the preparation of an aqueous solution of boric acid which comprises reacting in aqueous solution from 1.5 to 2.5 moles of barium hydroxide and one mole of borax, said solution containing at least 0.2 gram moles of barium hydroxide and at least 0.2 gram moles of borax per liter, to produce as a precipitate barium metaborate, separating the barium metaborate and reacting it in admixture with carbon dioxide and water to produce an aqueous solution of boric acid.

References Cited in the file of this patent

UNITED STATES PATENTS 1,108,129   Burger _____ Aug. 25, 1914

FOREIGN PATENTS 352,137   Great Britain _____ Apr. 28, 1930

OTHER REFERENCES

Winkler: J. Am. Chem. Soc., vol. 29, pp. 1366–71, 1907.

Mellor: "Comprehensive Treatise on Inorganic and Theoretical Chemistry," vol. 5, pages 47, 87, 88, 89 (1924), Longmans, Green and Co., N.Y., N.Y.